United States Patent Office 3,208,894
Patented Sept. 28, 1965

3,208,894
METHOD OF MAKING IMPREGNATED BASE MATERIALS, EMPLOYING UNSATURATED POLYESTER RESIN
Kotaro Yanagihara, 37 2-chome, Hyakunincho, Shinjuku-ku, Tokyo, and Takenori Suzuki, 1380 Kamikodanaka, Kawasaki, Japan
No Drawing. Filed Nov. 21, 1960, Ser. No. 70,403
Claims priority, application Japan, Nov. 24, 1959, 34/36,829
7 Claims. (Cl. 156—307)

This invention is directed to a method of manufacturing impregnated base materials, employing unsaturated polyester resins in a dry-type lamination. In particular, it relates to the use of unsaturated liquid polyester resin together with another liquid material having, per molecule, two or more functional groups which are capable of chemical combination with the functional groups contained mainly in the end groups of the said resin. The latter are —OH or —COOH radicals, for example. Both liquids are applied to a laminate base, and thereafter react chemically with each other, during the impregnation and drying processes. They are transformed into a non-tacky and semi-cured state, at normal temperature.

Commonly, the unsaturated polyester resin employed in lamination is in liquid condition. It is usually a mixture of unsaturated polyesters, being produced by a condensation reaction between maleic anhydride (or fumaric acid) and glycol, together with styrene monomer as cross-linking agent. A small quantity of organic peroxide, such as benzoyl peroxide, is added to the liquid to serve as a polymerization catalyst, in the laminating process. A base material is immersed in this liquid resin, and is formed into a lamination, which is then put between thin films, such as cellophane paper, and heated at a temperature below 100° C., under a pressure of 10 kg./cm.$^2$ or less. This process is known as the low-pressure wet-laminating method.

The unsaturated polyester resins offer many advantages over phenol-formaldehyde, or melamine-formaldehyde resin, in the condensation type, high-pressure (over 100 kg./cm.$^2$) laminating method. It can be applied to a base material without the help of a solvent. It hardens through a polymerization reaction, generating no volatile materials such as water, and has a high reactivity. As a result, it can be formed into a laminate at a low pressure and at a low temperature. These advantages have advanced its use in making construction materials featuring good mechanical strength, such as reinforced plastics having glass fiber cloth base.

The unsaturated polyester resin, however, has a drawback which hinders its use in mass production. Since the resin of the resin-impregnated base is in a highly tacky and viscous state, and since the resin is itself incapable of remaining in stable, semicured state (in contradistinction to phenol resin), this greatly hampers the processing efficiency. Worst of all, the viscosity of the said resin falls markedly during the heating process, and the use of very low pressure permits outflow of much of the resin content, with the result that the finished lamination is generally inferior to a high-pressure lamination, both in appearance and in electrical qualities. To eliminate such defects, it is usually necessary to adopt a contact-pressure laminating process operating, at normal temperature, and employing both a catalyst and an accelerator, or it is necessary to use a special metal mold, such as a matched die.

Accordingly, in order to obtain a more favorable polyester resin lamination it is imperative to find a suitable compounding and manufacturing process which will make it feasible to convert the resin into a semicured state, through a dry-type lamination. By such process, the resin can be formed into laminations without loss of its excellent physical and chemical qualities, and at the same time it is kept in a state most favorable to the mass production of laminations.

The present invention is designed to solve this important and difficult problem, by providing an entirely new method of manufacture of impregnated base materials characterized by use of non-tacky polyester resin in a dry-type lamination.

Before entering into the details of the new invention, it appears desirable to examine, a little further, some of the generally known unsaturated polyester resins. The high viscosity, unsaturated polyester resins having comparatively little tackiness are usually synthesized by mixing a glycol, such as propylene glycol, diethylene glycol, 2.2 dimethyl 1.3 propanediol, 2.2 diethyl 1.3 propanediol, or octylene glycol, with an organic dibasic acid, chiefly maleic anhydride, or fumaric acid, chlorinated phthalic acid, in a mol ratio of 1:1, and then heating the mixture at 150° C. to 200° C. in an inert gas, such as $CO_2$, for 8 to 15 hours, so that a condensation reaction occurs between the glycol and the acid. The viscosity of the resultant polyester is over $10^4$ poise (at 50° C.). Again by using, as a cross-linker, 25% to 35% triallyl cyanurate (hereinafter referred to as TAC), diallylphthalate prepolymer (hereinafter referred to as DAP) or a mixture or both, instead of the conventionally employed styrene monomer, the viscosity of the mixed solution of polyester and TAC or DAP can be markedly increased, as compared with cases where styrene monomer is employed. Thus, it is possible to make a resin of high viscosity (1 to $5 \times 10^3$ poises at 50° C.) presenting no flowability and no tackiness at room temperature. Such processing is applicable to all unsaturated polyester resins and is used in premixes now on the market. However, this type of resin is not altogether free from defects. For, when applied to a base material, it produces an intermolecular cohesion force, causing strong tackiness between layers of the bases, which cannot be prevented without the help of spacer films inserted between the bases. If a less tacky resin is to be obtained by the same processing, the viscosity of the unsaturated polyester and cross-linker solution should be at least $10^4$ poises (at 50° C.) and, as a result, the viscosity of the polyester resin itself is required to be as much as $10^6$ poises (at 50° C.), and above. This involves considerable difficulty in choosing materials for the resin, as well as in the processing technique. In addition, this type of super-high viscosity resin has low solubility and low impregnation ability, in regard to the solvent and the base material, respectively, with the result that the water resistance and electrical properties of the lamination are likely to be inferior or to deteriorate. A more fatal drawback, in the resin, is that its non-tackiness is in fact due to an absence of flowability at normal temperature, which is quite different from a semi-cured state. Accordingly, once it is heated and pressed, an outflow of resin will be inevitable.

Unlike this conventional processing system, wherein a super-high viscosity resin is directly synthesized and applied to a base material, the new method employs two types of liquids, one of which is an unsaturated polyester resin obtained by an ordinary and conventional process, and the other of which has a number of functional groups capable of chemical combination with the end groups of the said resin. These two liquids react with each other during a heat drying process, being converted into a super-high viscosity non-tacky laminate base material in a semi-cured B state.

Of the two liquids, the first is compounded by the following procedure. An unsaturated polyester resin is synthesized, with ordinary materials and by a conventional process. To this resin is added a crosslinker consisting of TAC (triallyl cyanurate) or DAP or a mixture of both, comprising 25% to 35% of the whole amount, and so that the viscosity of the solution is 1 to $5 \times 10^3$ poises (at 50° C.), and its acid value is 40 to 60. The resultant solution is mixed with an equal weight of an organic solvent of a ketone type, an alcohol type, an aromatic hydrocarbon type or a chlorinated hydrocarbon type. Finally, a polymerization catalyst for heat setting (e.g. cymene hydroperoxide, ditertiary butylperoxide, tertiary butylperbenzoate, 2.2 bis-tertiary butylperoxybutane, 2.5 dimethyl hexane 2.5 dihydroperoxide, etc.) is added, in an amount of 1% to 3%.

The second liquid is a chemical compound containing, per molecule, two or more functional groups capable of easy reaction with the —OH or —COOH groups (chiefly present as end groups) of the polyester in the first liquid. Usually, this compound is either a polymer of a low degree of polymerization, such as epoxy resin

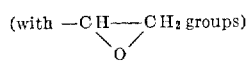
(with —CH——CH$_2$ groups)

polyamide resin (with —NH$_2$ or >NH groups), and polyurea resin (with —NH$_2$ or =NH groups), or a low-molecular weight compound such as a polyisocyanate (with —NCO groups), a polyisothiocyanate (with —NCS groups), and polyamine (with —NH or —NH$_2$ groups). In case of necessity, this compound is dissolved in a solvent of a ketone type, an alcohol type, an aromatic hydrocarbon type, together with a condensation-polymerization catalyst or a reaction accelerator or a hardener, either of which is activated at 100° C. to 130° C.

As for the weight ratio of the first liquid to the second, it is theoretically determined by the equivalent of the second liquid required for reacting with the functional groups involved in the first. Usually the ratio of the non-volatile matter in the first liquid to the one in the second is preferably in the weight range of 100:3 to 100:30. The impregnation of two liquids can be carried out either by immersing a base material in the mixture of the two liquids or by applying them separately to the base material. In the latter case, it is possible to spray the liquids by means of two spray guns simultaneously or individually. In either type of impregnation, the base material is then heat-dried at 90° C. to 130° C. for 20 to 40 minutes, during which the polyester acquires a super-high viscosity through a reaction between the functional groups in both liquids, until finally the base material is in a semi-cured B state and has no tackiness under normal temperature. Thus it is possible to form a lamination, of a uniform quality, with 40% to 50% resin content, by heating and pressing at a temperature of 130° C. to 150° C. and a pressure of 50 kg./cm.$^2$ or less for 1 to 2 hours.

The new invention has widened the application of polyester laminates. One of their uses is for a printed circuit base material, widely employed in communication apparatus. The commonest type of such material so far in use is paper base phenol resin laminations covered with copper foil on one side or on both sides. Phenol laminations, however, have proved to be unsatisfactory in respect to electrical properties, moisture absorption, or punching quality, and are incapable of meeting the demands of highly efficient and stabilized electronic apparatus, especially carrier communication apparatus or electronic computers. As a substitute for phenol resin laminations, polyester resin laminations have been introduced. But the processing of printed plates made of polyester resin by the traditional wet-type method have so far involved a number of disadvantages. The most serious defects are that, by this method, it is necessary to separate the process of foiling from that of lamination, and this not only lowers manufacturing efficiency but also causes deterioration in the peel strength of laminations and other properties. The newly invented dry-type method, however, makes it possible to carry out the foiling and lamination simultaneously, with the result that excellent printed circuit plates can be mass-produced.

The details of the new invention are illustrated in the following examples, which are preferred but non-limiting embodiments.

EXAMPLE 1

The first liquid here used is compounded through the following procedure. A condensation product is obtained by the conventional process described above, employing a mixture of diethylene glycol, propylene glycol and maleic anhydride in a mol ratio of 0.3:0.7:1 so that the viscosity and acid value of the product are 23000 poises (at 50° C.) and 53, respectively. Then the product is mixed with the cross-linking agent TAC (triallyl cyanurate) in the ratio of 75:25 (by weight). Next, 100 units (weight ratio) of this resin is mixed with 2 units of 2.5 dimethyl hexane 2.5 dihydroperoxide, as catalyst, and 100 units of methyl ethyl ketone.

The second liquid is compounded of 20 units of epoxy resin (trade name "Epikote 828," sold in the United States under the name Epon 828), with a molecular weight of 350, 6 units of diamino diphenyl sulfone as a hardener and 20 units of methyl ethyl ketone as a solvent. After mixing the first liquid with the second, it is applied to a base material composed of rayon pulp paper 0.1 mm. thick, cotton cloth 0.2 mm. thick for a laminate base, polyethylene terephthalate fiber spun cloth 0.6 mm. thick, or glass cloth 0.1 mm. thick, so that the resin content amounts to 40% to 50%. By heat-drying this base at 110° C. for 30 minutes, a resin impregnated base material is obtained, which shows no tackiness at normal temperature. Several sheets of these bases are placed one upon another, so that they form a lamination 1.5 mm. thick, and then they are placed between smooth stainless steel plates covered with a release agent, and compressed by means of an automatic oil-pressure press at 40 kg./cm.$^2$, at 150° C. for one hour. The lamination produced in this manner has an excellent exterior appearance, and permits little outflow of resin. The printed circuit base material the characteristics of which are shown in Table 1, is to be processed under the same conditions by placing electrolytic copper foils of 0.035 mm. thickness on the top and bottom of the base. As seen from Table 1, it has high peel strength and heat resistance.

It is noted that, if the first or second liquid alone is applied to the base and heated at 110° C. for 30 minutes, the resultant base material fails to acquire sufficient non-tackiness to prevent mutual adhesion of bases, and that when it is compressed at 150° C. and 40 kg./cm.$^2$, there occur a considerable outflow of resin. From this fact, we conclude that, in the case of a mixture of the two liquids, the terminal —OH or —COOH groups of the polyester (simply represented as HO—R$_1$—COOH) react with the

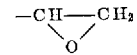

groups of epoxy resin (simply represented as

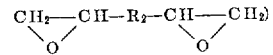

and thus form a combination as follows:

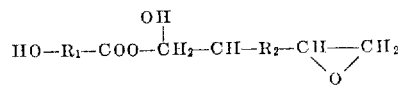

or

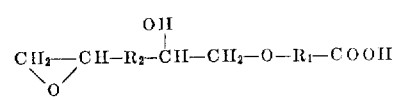

It follows accordingly that there occurs a formation of epoxymodified polyester, which has the function of effecting a semi-cured state of the mixed liquid.

As for the shelf life of the said mixture and base material, it has been confirmed that there is no change in their quality after 6 months storage at a room temperature, owing to the high activation temperature (over 100° C.) of the service catalyst and hardener.

In Table 1 we compare the main characteristics of lamination and printed circuit base material processed on glass cloth and polyethylene terephthalate fiber cloth. The comparison is between the two-liquid impregnation described in our Example 1, and polyester resin on the market.

TABLE 1

*Characteristics of laminations and printed circuit base materials in Example 1*

| | Characteristics (unit) | Standards | Mixture of liquids I and II | | Polyester resin alone | |
|---|---|---|---|---|---|---|
| | | | Glass cloth | Dacron cloth | Glass cloth | Dacron cloth |
| Lamination | Tensile strength (kg./cm.²) | JISK-6707 | 2,600 | 850 | 2,300 | 650 |
| | Young's modulus at bending (kg./cm.²) | JISK-6707 | 3×10⁵ | 6×10⁴ | 2×10⁵ | 4×10⁴ |
| | Heat resistant temperature (° C.) | JISK-6705 | 150 | 130 | 140 | 120 |
| | Water absorption (percent) | ASTMD-570 | 0.1 | 0.4 | 0.3 | 0.8 |
| | Volume resistivity (Ω cm.) | JISK-6707 | <10¹⁶ | <10¹⁵ | 10¹⁵ | 10¹⁵ |
| | Insulation resistance (2-hr. boil) | JISK-6707 | 10⁶ | 10⁶ | 3×10³ | 5×10⁴ |
| | Dielectric strength (kv./mm.) | JISK-6705 | 45 | 40 | 35 | 31 |
| Printed circuit base material | Peel strength of copper foil (kg./cm.) | NEMA | 1.50 | 1.45 | 0.35 | 0.40 |
| | Dip soldering resistance (sec., 240° C.) | NEMA | <20 | 10 | (*) | (*) |
| | Punching quality (at room temperature) | ASTMD-617 | Fair | Good | Poor | Fair |

*No resistance,

Notes:
1. Dacron cloth used here is a scoured and isocyanate-resin treated one.
2. The respective thickness of a lamination and a printed circuit base material is 1.5 mm. and 1.6 mm.

EXAMPLE 2

The first liquid is compounded as follows. First, a condensation product is obtained by mixing octylene glycol, maleic anhydride and tetrachlorphthalic acid at a mol ratio of 1:0.8:0., so that the viscosity and acid value of the product are 30,000 poises and 40, respectively. This product is then mixed with DAP (diallylphthalate prepolymer) in a ratio of 7:3. Next, 100 units of the thus produced, unsaturated polyester resin is mixed with 2 units of cymene hydroperoxide and 400 units of methylene chloride.

The second liquid is compounded from 10 units of 4,4',4''-triphenylmethane tri-isocyanate, belonging to the polyisocyanate type, and 200 units of methylene chloride.

These two liquids are placed in separate receptacles and simultaneously sprayed onto glass cloth, 0.1 mm. thick, by means of a spray gun in a ratio of 1:1. After that, the base material is heat-dried at 90° C. for 30 minutes, so that the resin content amounts to 40%. Under these conditions, the base material has shown no tackiness at normal temperature. Fifteen sheets of these plates are placed one upon another and formed into a lamination at 50 kg./cm.², at 150° C. and for 2 hours. The resultant lamination is 1.5 mm. thick, with smooth surface and uniform quality. From this we can conclude that during the spraying and heating processes the —OH and —COOH groups in polyester (HO—R₁—COOH)

react with the —NCO groups in polyisocyanate

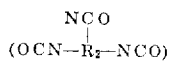
(OCN—R₂—NCO)

thus producing

OCN—R₂—NHCOO—R₁—COOH through a urethane linkage of the —OH groups, and

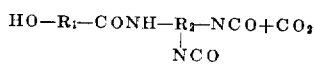
HO—R₁—CONH—R₂—NCO+CO₂ through an amide linkage of the —COOH groups, with the result that a semi-cured state of the resin has been effected.

Care should be taken to store the two liquids in separate receptacles, since a mixture will be short-lived due to the chemical activeness of isocyanate groups. In the case of impregnated and dried materials, however, they are serviceable for 6 months if reserved in completely dried conditions.

When it is necessary to use a mixture, an isocyanate having a high temperature of dissolution is chosen (such as Desmodur AP stable), and it is mixed at the same rate as in the former case, but the catalyst in the first liquid is replaced by 2.5 dimethyl hexane 2.5 dihydroperoxide. The temperature should then be 130° C. (for 30 minutes). As for the solvent, either trichlor ethylene or methyl ethyl ketone are equally available.

It is obviously within the scope of the invention to use other types of unsaturated polyester resins, epoxy resins, polyamide resins, etc., which can be readily found by a brief inspection of common textbooks on resins, or by a brief search through the indices of American Chemical Abstracts, or by a cursory search of the classified patents. It is also obviously within the purview of this invention to employ other commonly known cross-linking agents.

We claim:
1. The process of making a laminate, comprising impregnating and coating a base material with
   (A) a peroxide catalyst suitable for heat setting,
   (B) a liquid composition of a cross-linked unsaturated polyester resin having reactive —OH and —COOH groups and
   (C) a liquid composition of an epoxy resin having at least two functional groups per molecule; said compositions being applied to said base material before they are reacted with each other; then heating said base to effect the catalyst-promoted reaction of B with C to the "B state"; stacking a plurality of layers of said impregnated base upon one another and subjecting the stack to heat and pressure to form a laminate.

2. The process according to claim 1, wherein said polyester is prepared from an acid chosen from the group of maleic and fumaric acids and their anhydrides.

3. The process according to claim 2, wherein said unsaturated polyester is cross-linked with an agent chosen from the group consisting of triallyl cyanurate and diallylphthalate.

4. The process according to claim 2, wherein said cross-linked polyester and said epoxy resin are present in amounts equivalent to the reactive hydroxyl, carboxyl and epoxy groups therein.

5. The process according to claim 2, wherein at least one of the outermost layers of said stack is covered with an electroconductive metallic foil.

6. The process of making a laminate, comprising the steps of impregnating and coating a base material with
(A) a peroxide catalyst suitable for heat setting,
(B) a liquid composition of an unsaturated polyester resin having reactive hydroxyl and carboxyl groups and prepared from an acid chosen from the group consisting of maleic and fumaric acids and their anhydrides, said polyester resin being cross-linked by a cross-linking agent chosen from the group consisting of triallyl cyanurate and diallyphthalate until said resin has a viscosity in the order of $10^3$ poises (50° C.) and an acid value of 40–60,
(C) An epoxy resin having terminal epoxy groups capable of reacting with the hydroxyl and carboxyl groups of said polyester, said epoxy resin being present in an equivalent amount to satisfy all the reactive groups of said polyester, said compositions being applied to said base material before they are reacted with each other, heating said impregnated and coated base to a temperature of substantially 130° C. until the catalyst-promoted reaction of the polyester resin with the epoxy resin achieves the "B state," stacking a plurality of layers of said impregnated and reacted base and subjecting the stack to heat and pressure to form a laminate.

7. The method according to claim 6, wherein at least one of the outermost layers of said stack is covered with an electroconductive metallic foil.

References Cited by the Examiner

UNITED STATES PATENTS

| | | | |
|---|---|---|---|
| 2,691,007 | 10/54 | Cass | 260—45.4 |
| 2,822,344 | 2/58 | Duhnkrack | 260—45.4 |
| 2,859,199 | 11/58 | Parker | 154—43 |
| 2,905,652 | 9/59 | Best | 260—75 |
| 2,916,403 | 12/59 | Calderwood | 260—75 |
| 3,044,913 | 7/62 | Lundberg | 156—332 XR |
| 3,063,958 | 11/62 | Perkins. | |

FOREIGN PATENTS

| | | |
|---|---|---|
| 575,446 | 5/59 | Canada. |
| 735,151 | 8/55 | Great Britain. |

EARL M. BERGERT, *Primary Examiner.*

CARL F. KRAFFT, *Examiner.*